United States Patent
Ivan, Sr.

(10) Patent No.: US 9,303,455 B2
(45) Date of Patent: Apr. 5, 2016

(54) ICE AUGER ASSEMBLY INCORPORATING AN ICE REAMING BLADE

(71) Applicant: Eric John Ivan, Sr., Monticello, NY (US)

(72) Inventor: Eric John Ivan, Sr., Monticello, NY (US)

(*) Notice: Subject to any disclaimer, the term of this patent is extended or adjusted under 35 U.S.C. 154(b) by 153 days.

(21) Appl. No.: 14/120,931

(22) Filed: Jul. 12, 2014

(65) Prior Publication Data
US 2016/0010393 A1    Jan. 14, 2016

(51) Int. Cl.
| | |
|---|---|
| *E21B 7/00* | (2006.01) |
| *E21B 10/32* | (2006.01) |
| *A01K 97/01* | (2006.01) |
| *E21B 7/28* | (2006.01) |
| *E21B 10/26* | (2006.01) |

(52) U.S. Cl.
CPC .............. *E21B 7/008* (2013.01); *A01K 97/01* (2013.01); *E21B 7/28* (2013.01); *E21B 10/26* (2013.01); *E21B 10/32* (2013.01)

(58) Field of Classification Search
CPC ....... E21B 7/008; E21B 10/32; E21B 11/005; E21B 10/44; E21B 7/28; A01K 97/01; B23B 51/02; E02D 5/44
See application file for complete search history.

(56) References Cited

U.S. PATENT DOCUMENTS

| | | | | |
|---|---|---|---|---|
| 139,769 | A | | 6/1873 | Clark |
| 537,729 | A | * | 4/1895 | Smith ...................... E21B 7/003 175/202 |
| 1,710,998 | A | * | 4/1929 | Rudkin ................... E21B 10/32 175/285 |
| 1,970,063 | A | * | 8/1934 | Steinman ................. E21B 7/28 175/202 |
| 2,401,250 | A | * | 5/1946 | Kandle .................... E21B 10/44 175/242 |
| 2,481,781 | A | * | 9/1949 | Rawlinson, Sr. ........ E21B 10/32 175/285 |
| 3,299,970 | A | | 1/1967 | Anderson |
| 3,336,989 | A | * | 8/1967 | Henderson ............. A01K 97/01 175/18 |
| 3,397,750 | A | | 8/1968 | Wicklund |
| 3,749,184 | A | | 7/1973 | Andeen |
| 4,616,720 | A | * | 10/1986 | Kitanaka .................. E02D 5/44 175/263 |
| 4,819,744 | A | | 4/1989 | Caswell |
| 5,190,113 | A | | 3/1993 | Hawrylak |
| 5,873,419 | A | | 2/1999 | Berry et al. |
| 5,950,738 | A | | 9/1999 | Caswell et al. |
| 6,502,649 | B1 | * | 1/2003 | Havel ...................... E21B 7/008 175/18 |
| 7,506,697 | B2 | * | 3/2009 | Pflieger .................... E21B 7/008 175/18 |
| 8,500,370 | B2 | * | 8/2013 | Ditillo ....................... E02D 5/36 175/19 |
| 8,646,547 | B1 | * | 2/2014 | Johnson ................... A01K 97/01 175/170 |
| 2016/0010393 | A1 | * | 1/2016 | Ivan, Sr. ................... E21B 7/008 175/18 |

* cited by examiner

*Primary Examiner* — Daniel P Stephenson
(74) *Attorney, Agent, or Firm* — Sandra M. Kotin (57) ABSTRACT

An ice auger has a rotatable rod adjacent and parallel to the central shaft supported at the bottom in a cylindrical receptacle. A vertical ice reaming blade is attached to the rod above the receptacle and a retaining loop affixed to the shaft and positioned above the blade prevents the rod from rising out of the receptacle. A right angled handle at the top of the rod extends outward above and in the same plane as the blade. A spring biased latch assembly disposed near the top of the shaft engages the handle with the blade in rest position. Releasing the latch frees the rod to rotate 180° and move the blade to use position extending outward beyond the standard auger members to ream the bottom of the ice hole. Vertical support posts stabilize the system and prevent wobble. One post functions as a stop and back support for the blade during use.

21 Claims, 6 Drawing Sheets

ICE AUGER ASSEMBLY INCORPORATING AN ICE REAMING BLADE

FIELD OF THE INVENTION

The instant invention relates to ice augers and more specifically ice augers equipped with a reaming blade to remove the sharp bottom edge and flare the lower portion of the ice hole.

BACKGROUND OF THE INVENTION

From early times man has devised ways to break through the ice to reach the water below for his personal needs and to catch the fish dwelling in the body of water. The first patent for an ice auger issued to Clark in 1873 (U.S. Pat. No. 139,769). Today, ice fishing has become a major winter pastime evoking the creativity of the fishermen in devising more efficient means to insure the retrieval of their catch. Ice augers themselves have not changed appreciably in recent years, but though they are capable of drilling through ice layers of from several inches to more than five feet, the resulting hole always has a sharp edge at its bottom. Once a fish has been caught, the line must be played and the fish drawn up through the relatively narrow hole. Often, the line, stretched at a right angle and rubbing against the sharp edge of the hole is broken and the prize fish of the day is lost. A fish may be pulled hard against the edge and injured or the hook dislodged from its mouth and again lost. Or, it may be difficult to turn a large fish into the narrow hole and again the fish may be injured or lost.

Many attempts have been made to develop devices to ream the edge of the hole both to smooth the sharp edge so the line will not be severed and to flare the bottom of the hole to make it easier to pull the fish through. Anderson, in U.S. Pat. No. 3,299,970, teaches a reamer that is hand rotated, has horizontal support struts that rest on the surface of the ice and an annular guide ring to steady the reamer. Two pivotally attached blades can be flared outward to smooth the edge and widen the lower portion of the hole. This device also has a pivoted handle to assist in lifting the device after the edge has been reamed. Wicklund teaches a hand rotated reamer with a central tubular shaft, two pivotally mounted blades, and a spring biased control rod disposed within the tubular shaft. The control rod is raised to extend the blades outward to ream the hole. (U.S. Pat. No. 3,397,750) See also the hand rotated ice hole flarer of Andeen, U.S. Pat. No. 3,749,184, which utilizes three reaming blades and to which an ice cutting tool may be attached to make the initial hole in the ice. The devices of Wicklund and Andeen must be hand held and hand rotated with no additional support to prevent wobble while the bottom of the hole is reamed.

In U.S. Pat. No. 5,873,419, Berry et al. teach a motor driven hole reamer having a central tubular shaft and a control rod that is disposed adjacent to the central shaft to change the orientation of support arms that extend and retract the reamer blades. This device also includes two horizontal plates about the central shaft, a movable plate that can be adjusted in height along the central shaft according the thickness of the ice and a fixed plate at the bottom of the shaft to which the blade assembly is attached. The two plates serve to steady the reamer within the hole for a more efficient operation.

All of these devices must be carried on to the ice in addition to the auger, fishing gear, and any other equipment the sportsman may require, all while wearing many layers of warm clothing. This has lead to the development of devices that include a reaming blade with the auger. In U.S. Pat. No. 4,819,744, Caswell teaches an ice auger equipped with ice boring blades and ice reaming blades in addition to the flighting or helical blade. A central tubular shaft surrounds a drive bar that controls the pair of ice boring blades to cut through the ice while the helical blade brings the ice chips to the surface. When the initial hole has been cut through the ice layer, the reaming blades are engaged by the drive bar to smooth the edge and flare the lower portion of the hole. A brace and bit arrangement attached to the top of the drive bar is manually rotated both to drill the hole and to ream the edge.

Hawrylak, in U.S. Pat. No. 5,190,113, attaches a horizontal tubular housing that is slightly shorter than the radius of the helical blade to the bottom of the central tubular shaft of a conventional ice auger. A spring biased reaming blade is disposed within this housing and is activated by means of a cable that extends from the blade to the top of the shaft where it engages a rotatable lever. The auger is motor driven and once the hole has been cut the lever is rotated, the reamer blade extended and the edge of the hole reamed. The helical auger blade also helps to center the device within the hole. The reamer blade of this device appears to be sufficient size to smooth the edge of the hole, but is too narrow to provide a widened or funnel shaped opening.

In U.S. Pat. No. 5,950,738, Caswell et al. have developed an attachment to a conventional motor driven ice auger to ream the bottom of the ice hole. A bracket is mounted near the ice cutting blade which is attached to the advancing edge of the flighting. The bracket forms a pivotal attachment for the reaming blade that has two positions, a transport position that is substantially vertical and an operable position which is substantially horizontal. The reaming blade is biased toward the transport position but is set about one inch outward of the radius of the helical blade so that once the auger breaks through the ice layer the reaming blade extends outward beyond the edge of the hole below the bottom surface of the ice sheet. A slight upward motion of the auger causes the reaming blade to catch the underside of the ice layer and ream it into a funnel shape. The auger can then be lowered sufficiently below the ice layer so the reaming blade returns to the transport position causing it to come in contact with the slanted lower wall of the ice hole where it moves upward along the funnel shape and into the ice hole so the device can be lifted out of the hole. A stabilizing ring is mounted on the central shaft of the auger above the ice cutting blade. The operation of the reaming blade depends upon the operator raising and lowering the auger at the proper time, while the motor is engaged, to activate and deactivate the reaming blade, all the while maintaining the auger in the vertical orientation properly centered in the hole.

There is a need for an ice auger equipped with a reaming blade that can easily be operable from a first resting position to a second reaming or use position and thereafter returned to the first position. There is a need for this to be accomplished while the motor is engaged, the auger is in full operation, and the operator does not have to raise or lower the rotating auger to return the reaming blade to the resting position before removing the auger from the ice hole. There is a need for such an equipped auger that has a reaming blade that is strong, sturdy and easy to engage while the auger is running so that there is no need to turn the motor on and off or for the operator to remove his hands from the motor handles. There is a need for such an equipped auger that has a blade that will smooth the edge of the hole and create a funnel shaped opening in a single operation that is both quick and efficient.

BRIEF SUMMARY OF THE INVENTION

The present invention provides a conventional motor driven ice auger equipped with a reaming blade assembly that is operable using a spring biased latch assembly for ease of release and engagement. The operator can activate the ice reaming blade while continuing to operate the auger without the need to turn the motor on and off or reposition the auger within the ice hole. The reaming blade smooths the sharp edge of the hole and flares the lower portion of the hole in a single operation.

It is an object of the present invention to provide a conventional motor driven ice auger that is also equipped to ream the bottom of the ice hole.

It is another object of the present invention to provide an ice auger equipped with a strong and durable ice reaming blade.

It is a further object of the present invention to provide an ice auger wherein the ice reaming blade is easily activated and deactivated by utilizing a spring biased latch while operating the auger.

Another object of the present invention is to provide an ice reaming blade assembly that can not freeze up during use.

It is still further object of the present invention to provide an ice auger utilizing vertical stabilizing posts to prevent wobble while the auger is in use and more particularly while the reaming blade is in use.

Another object of the present invention is to enable a conventional ice auger to be modified to include the reaming blade as well as to have the reaming blade included at the point of manufacture.

An object of the present invention is also to provide an ice auger equipped with a reaming blade that does not take up any additional space so that it can be carried, used and stored in the same space and manner as the conventional auger.

A further object of the present invention is to provide a removable ice reaming blade so that the blade can be easily sharpened, repaired or replaced as needed.

In furtherance of the objects of the present invention there is provided an ice hole reaming assembly in combination with an ice auger having a central shaft with an upper end and a lower end, a helical blade affixed along an inside edge to the central shaft and extending outwardly therefrom, a concave split ring affixed about the lower end of the central shaft, an ice cutting blade reversibly attached to a leading edge of the split ring, and a vertically oriented ice penetrating blade affixed to the lower end of the central shaft. The ice hole reaming assembly has a series of cutouts along the inside edge of the helical blade which are in vertical alignment and form a channel adjacent to the central shaft. There is a cylindrical receptacle with an upper rim and a floor securely affixed to the central shaft beneath the channel and near the lower end of the central shaft, a rod extending substantially the length of the central shaft and having a first end and a second end, the second end being disposed in the receptacle so that the rod is supported therein, the rod being parallel to and in spaced relation with the central shaft. A portion of the first end of the rod extends above the channel and is bent into a right angle, the bent portion forming a handle. There is also an ice reaming blade having a top edge, a bottom edge, front and back surfaces, a rear edge and a forward angled cutting edge, the ice reaming blade being securely attached to the rod above the upper rim of the receptacle. The attachment to the rod is along the back surface adjacent to the rear edge and the ice reaming blade extends outwardly from the rod to be positioned directly beneath and in the same plane as the handle. The ice reaming blade has a rest position in which it does not extend beyond the split ring and a use position in which the ice reaming blade extends outwardly beyond the split ring to ream the ice hole. There is also a retaining loop affixed to the central shaft above the top edge of the ice reaming blade and encircling the rod. The rod is freely rotatable within the retaining loop, and the retaining loop maintains the rod in vertical orientation adjacent to the central shaft and prevents the rod from being lifted out of the receptacle. A latch assembly is affixed to the central shaft substantially at the level of the handle and positioned so that when the handle is engaged in the latch assembly the ice reaming blade is in the rest position and when the handle is released from latch assembly the rod rotates and the ice reaming blade is moved to the use position. The ice hole can be drilled and reamed in one operation while the auger is activated.

The invention is also an ice auger including an ice hole reaming blade for use in cutting a hole in the ice and reaming the bottom edge of the ice hole. The ice auger has a central shaft with an upper end and a lower end and a helical blade with an inside edge and an outside edge affixed to the central shaft along the inside edge. There is a series of cutouts along the inside edge in vertical alignment forming a channel adjacent to the central shaft. A concave split ring is affixed about the lower end of the central shaft and has a leading edge and a following edge. An ice cutting blade is reversibly attached to the leading edge of the split ring and a vertically oriented ice penetrating blade is affixed to the lower end of the central shaft and extends beyond the lower end. There is a cylindrical receptacle having an upper rim and a floor securely affixed to the central shaft beneath the channel near the lower end of the central shaft. A rod disposed within the channel extends substantially the length of the central shaft and has a first end and a second end, the second end is disposed in the receptacle such that the rod is supported therein. The rod is parallel to and in spaced relation with the central shaft. A portion of the first end of the rod extending above the channel is bent into a right angle, the bent portion forming a handle. There is an ice reaming blade having a top edge, a bottom edge, front and back surfaces, a rear edge and a forward angled cutting edge. The ice reaming blade is securely attached to the rod above the upper rim of the receptacle, the attachment being along the back surface adjacent to the rear edge. The ice reaming blade extends outwardly from the rod so that the ice reaming blade is positioned directly beneath and in the same plane as the handle. The ice reaming blade has a rest position in which it does not extend beyond the split ring and a use position in which the ice reaming blade extends outwardly beyond the split ring to ream the ice hole. A retaining loop is affixed to the central shaft above the top edge of the ice reaming blade and encircles the rod which is freely rotatable within the retaining loop. The retaining loop maintains the rod in vertical orientation adjacent to the central shaft and prevents the rod from being lifted out of the receptacle. A latch assembly is affixed to the central shaft substantially at the level of the handle and positioned such that when the handle is engaged in the latch assembly the ice reaming blade is in the rest position and when the handle is released from latch assembly the rod rotates and the ice reaming blade is moved to the use position. The ice hole can be drilled and reamed in one operation while the auger is activated.

Other features and advantages of the invention will be seen from the following description and drawings.

DETAILED DESCRIPTION OF THE INVENTION

Ice augers currently in use may generally have a central shaft of tubular construction encircled by a helical blade or fighting running substantially along the lower three quarters of the length of the central shaft. The helical blade may be welded to the shaft along the inside edge. An ice cutting blade may be reversibly attached to the leading edge of the helical blade which may be substantially coextensive with the lower end of the central shaft. The ice chips produced by the ice cutting blade may be transported to the surface by the helical blade. An attachment means may be located at the top of the central shaft by which a hand crank or motor may be attached to the central shaft to rotate the auger.

Figure 1:
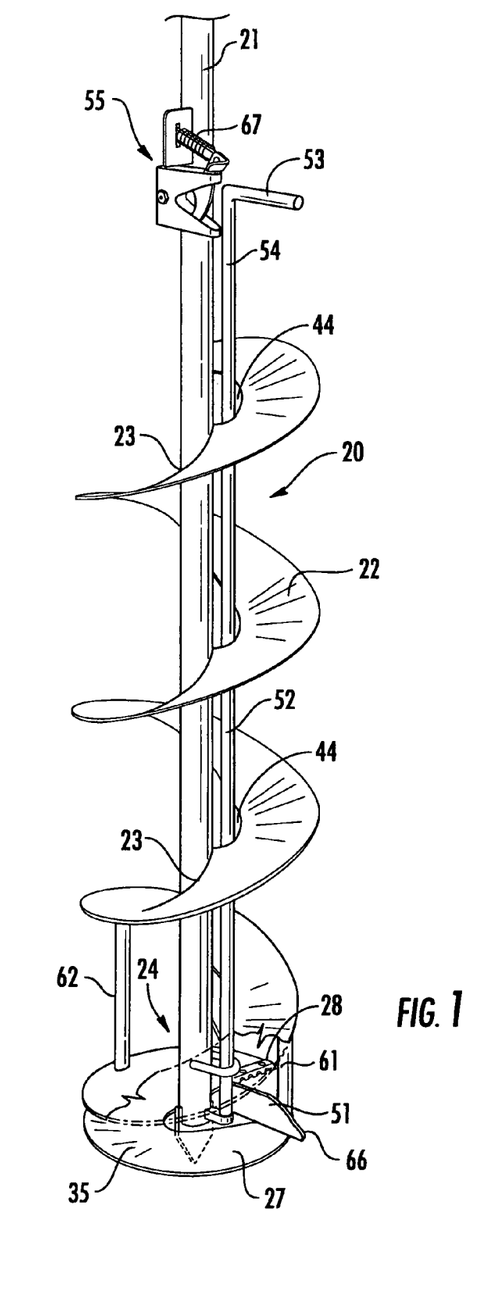
FIG. 1 is a perspective view of an ice auger encompassing the ice reaming blade assembly of the present invention.

The ice auger 20 ideally suited to the present invention and illustrated in FIG. 1 may have the tubular central shaft 21 and the helical blade 22 attached to the central shaft 21 along its inside edge 23. There may also be a metal concave split ring 27 of heavier construction than the helical blade 22 disposed substantially about the lower end 26 of the central shaft 21. The split ring 27 may act as a terminus and anchor for the leading edge 24 of the helical blade 22 which edge may be welded thereto. (See FIG. 11) The ice cutting blade 25 may be reversibly attached to the leading edge 30 of the split ring 27 and may be set at an angle of substantially 10°. The reversible attachment of the ice cutting blade 25 to the leading edge 30 of the split ring 27 may be accomplished with nuts 28 and bolts 29. A vertical triangular ice penetrating blade 31 may be affixed to the lower end 26 of the central shaft 21. The ice penetrating blade 31 may have two upper extensions 32, seen in FIGS. 3, 4 and 11, which may be welded to opposing sides of the central shaft 21. The ice penetrating blade 31 may also serve as fixation and strengthening points for the split ring 27, the inner rim 33 of which may be welded thereto. A strut 34 may extend from the upper surface 35 of the split ring 27, just behind the ice cutting blade 25, to the central shaft 21 for stability and support. There may be additional braces or other strengthening means (not illustrated) to provide further stability and support to the system due to the excessive torque generated when the auger is in use.

Figure 9:
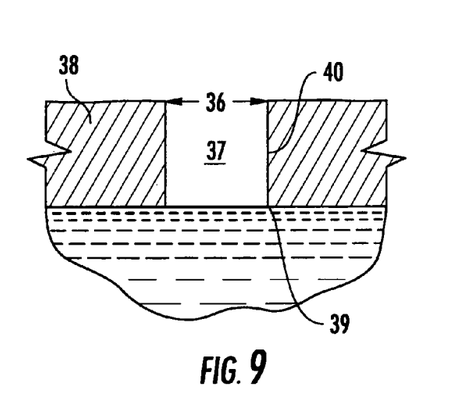
FIG. 9 is a vertical section through the ice showing the sharp edges at the bottom of the ice hole before reaming.

The width of the helical blade 22 may determine the diameter 36 of the ice hole 37 (FIGS. 9 and 10) and typical ice augers may produce ice holes with a diameter of 8 in (20.3 cm) or 10 in (25.4 cm), though other sizes may also be available. The outer edge of the helical blade 22, the split ring 27 and the ice cutting blade 25 may be coextensive.

The ice auger 20 of the present invention may be activated by a motor. The motor may be affixed to the top of the central shaft 21 by means well known in the art (not illustrated). Such motors may have handles extending outwardly on opposite sides of the motor to make holding the assembly secure and may enable easy and efficient operation of the ice auger. The user may typically select the desired site in which to drill, set up the auger, and drill through the ice. The triangular ice penetrating blade 31 may make the initial cut into the ice and thereafter the ice cutting blade 25 may complete the ice hole 37. Once the auger 20 penetrates the ice layer 38 the motor may be shut off and the auger 20 removed. The resulting ice hole 37, as noted above and seen in FIG. 9, may have substantially vertical side walls 40 with a sharp lower edge 39 forming a 90° angle with the side walls 40.

The above-described auger may be modified by the inclusion of an ice reaming assembly 50 with which to ream the lower portion of the ice hole 37 to remove the sharp edge 39 and widen or flare the lower portion 41 of the ice hole 37. Once completed, the fishing line may not be severed, it may be easier to pull the fish into and through the ice hole and the fish may not be damaged or lost.

The ice reaming assembly 50 may include a vertically oriented ice reaming blade 51, a rod 52 to which the ice reaming blade may be affixed, and a latch assembly 55. The rod 52 may be positioned adjacent and parallel to, but not touching, the central shaft 21. For this to be possible, the helical blade 22 which may normally be welded to the central shaft 21 all along its inside edge 23, must be cut out in specific areas along the inside edge 23 with the cut-outs in vertical alignment to form a vertical channel 44 into which the rod 52 may be disposed, as seen in FIG. 1.

Figure 11:
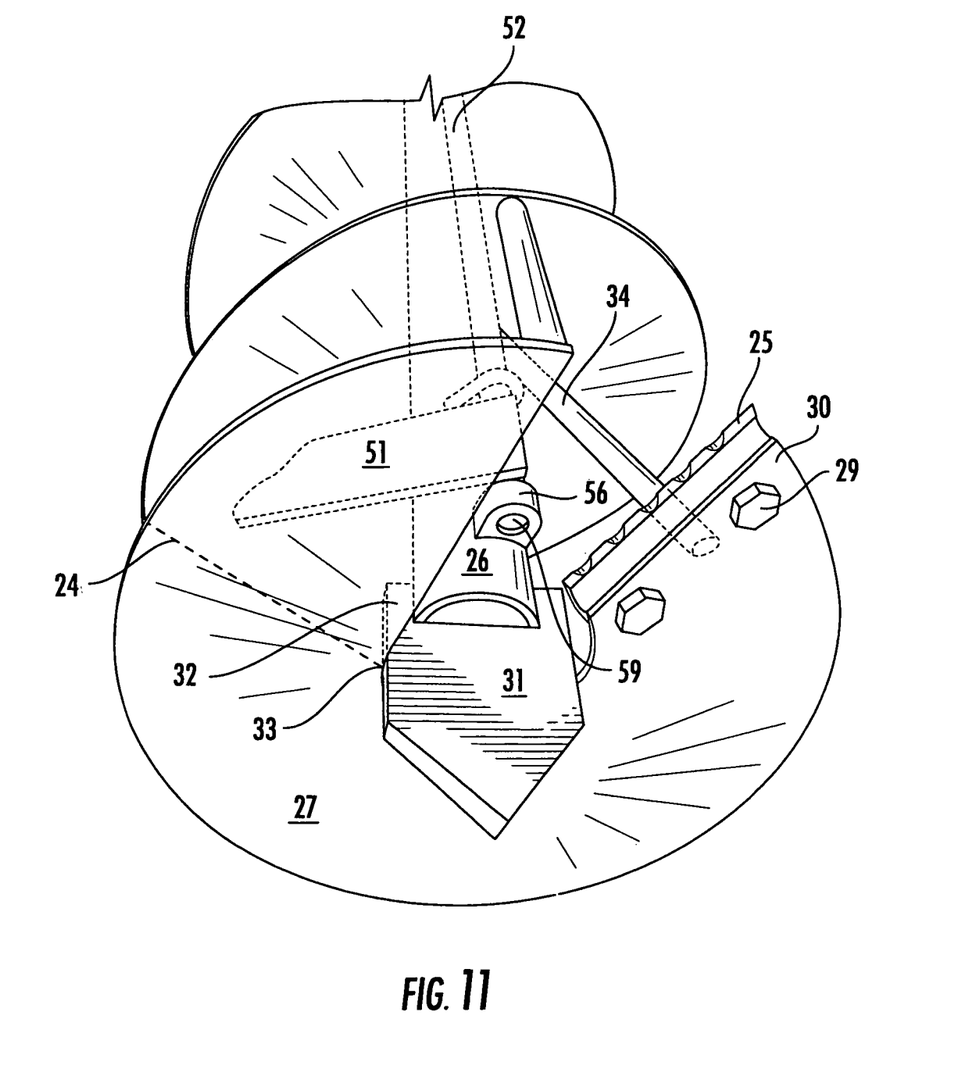
FIG. 11 is a bottom perspective view of the ice auger showing the reaming blade in rest position.

There may be a cylindrical receptacle 56 most clearly seen in FIG. 11, affixed to the central shaft 21 near its lower end 26 and directly beneath the channel 44, into which the bottom end of the rod 21 may be rotatably received. There may be an opening 59 in the bottom of the receptacle for drainage of water so the rod 52 does not become frozen in place and be rendered immovable. The receptacle 56 may function as the support and anchor for the rod.

The ice reaming blade 51 may be attached to the lower end of the rod 52 above the receptacle 56. The attachment of the ice reaming blade 51 to the rod 52 may be made along the back surface of the ice reaming blade 51 adjacent to its rear edge 64. It is essential that the attachment not be made along the rear edge 64 itself because the direction of the large shearing forces generated when the ice reaming blade 51 is in use during the reaming of the ice hole may be sufficient to crack the weld and sever a rear edge attachment.

A U-shaped retaining loop 57 may be affixed to the central shaft 21 at a point that is above the upper edge 58 of the ice reaming blade 51. The rod 52 may pass through the retaining loop 57, which may assist in maintaining the rod 52 in a vertical orientation and may prevent the rod 52 from rising upward and being displaced out of the receptacle 56. The dimensions of the retaining loop 57 may permit free rotation of the rod 52. See FIGS. 3 and 4.

The top portion of the rod 52 may be bent into a right angle forming a handle 53. The latch assembly 55 may be attached to the upper portion of the central shaft 21 and may hold the handle 53 securely to maintain the ice reaming blade 51 in a rest position. When the ice reaming blade 51 is needed, the latch assembly 55 may be opened to release the handle 53 and the ice reaming blade 51 may be moved to a use position. The latch assembly 55 may be activated by a spring biased bar 67 which may enable the user to contact the bar 67 in one quick motion to release the handle 53 while still operating the motor. Since the latch assembly 55 may be opened while the user is operating the motor, the rotation of the auger may cause the ice reaming blade 51 to shift to the use position without the user's further intervention once the handle 53 has been released. Moving the handle 53 back into the latch assembly 55 may also be accomplished in one motion so that it may be quickly and easily re-engaged into the latch assembly 55 once the ice hole has been reamed.

To provide additional stability and prevent wobble while the ice reaming blade 51 is operational, two or three vertical stabilizing posts may be added to the auger. When two vertical stabilizing posts are used, they may be permanently affixed between the split ring 27 and the helical blade 22 on opposing sides of the central shaft 21. Due to the configuration of the helical blade 22 the two stabilizing posts may not be of the same height. The bottom of the shorter stabilizing post 61 may be attached to the upper surface 35 of the split ring 27 near its following end 63, and the top of the shorter stabilizing post 61 may be attached to the lower or under surface of the portion of the helical blade 22 directly above it. The longer stabilizing post 62 may be disposed on the opposite side of the central shaft 21. The bottom of the longer stabilizing post 62 may be attached to the upper surface of the helical blade 22 near its leading edge 24 and the top may be attached to the lower surface of the portion of the helical blade 22 directly above it. The two stabilizing posts may be affixed at the outer edges of the split ring 27 and helical blade 22 for maximum stability and may be seen in FIGS. 1, 3 and 4. If three stabilizing posts are used, they may be equidistantly arranged about the central shaft 21 and may be of increasing length according to position. The addition of the stabilizing posts may completely eliminate any wobble during use and may make it possible to ream ice as thin as 2 inches (5.0 cm).

Figure 3:
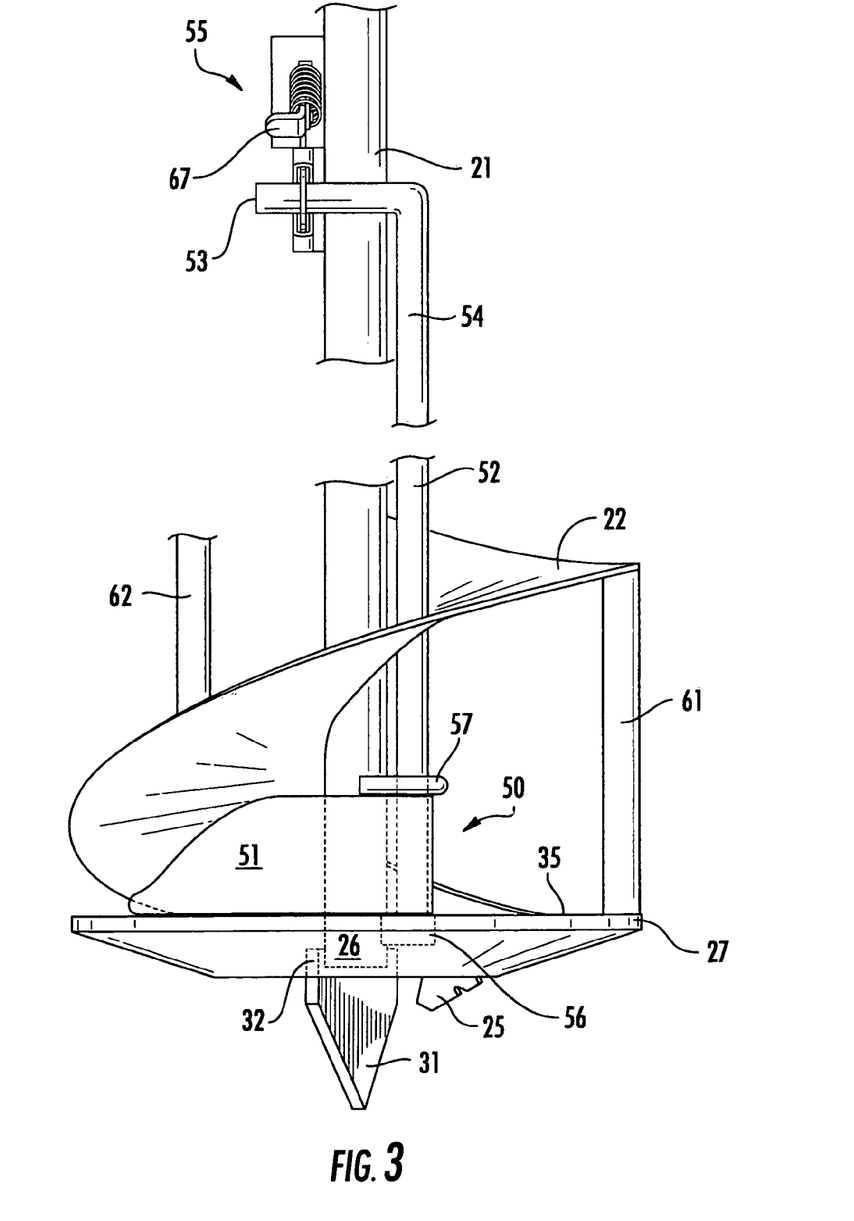
FIG. 3 is a truncated side plan view of the ice auger with the reaming blade and handle in the rest position.
Figure 4:
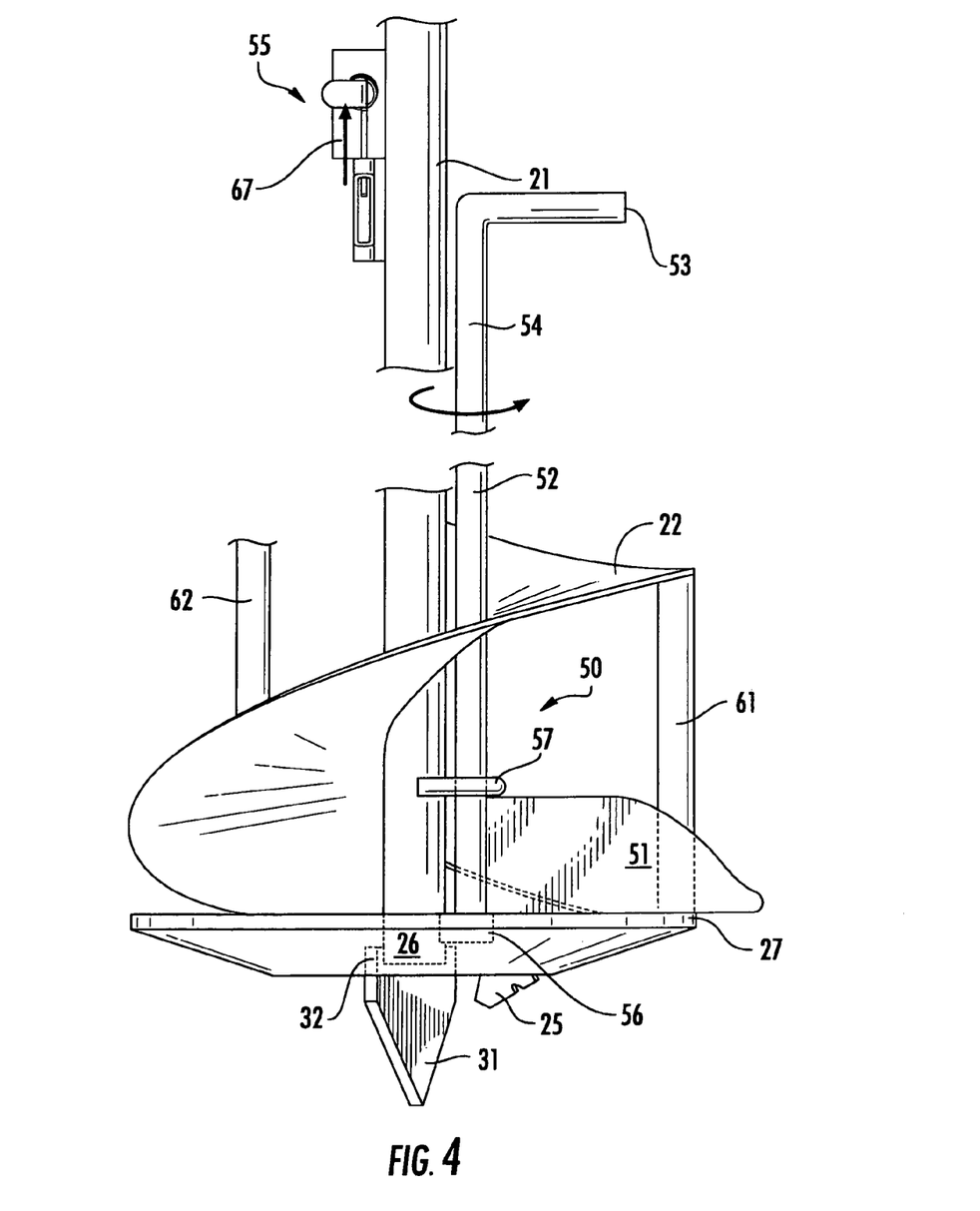
FIG. 4 is a truncated side plan view of the ice auger with the reaming blade and handle in the use position.

As noted above, the ice reaming blade 51 may have two positions, a rest position seen in FIG. 3 and a use position seen in FIG. 4. The right angle bend at the upper end 54 of the rod 52 creating the handle 53 may be oriented so that the handle 53 may lie directly over and in the same plane as the ice reaming blade 51. The user may observe the orientation of the handle 53 to know instantly whether the ice reaming blade 51 is in the rest position or the use position.

In the use position, the outer end of the ice reaming blade 51 may extend substantially 1.25 inches (3.2 cm) beyond the outer edge of the split ring 27. When the reaming operation is complete, the user may move the handle so that it may be re-engaged by the latch assembly 55. The ice reaming blade 51 may move through an arc of substantially 180° between the use position and the rest position. In the rest position, the ice reaming blade 51 may be wholly within the confines of the split ring 27 and it may have no effect on the initial cutting of the ice hole 37.

Figure 10:
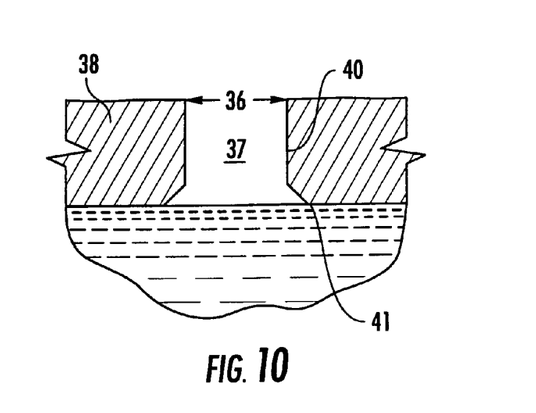
FIG. 10 is a vertical section through the ice showing the flared area at the bottom of the ice hole after reaming.

When the ice reaming blade 51 is in the use position the handle 53 may be substantially over the short stabilizing post 61 which may be situated radially outward of the retaining loop 57 and the ice reaming blade 51 may be in contact with the short stabilizing post 61. The specific location of the short stabilizing post 61 may be essential so that it may function first, as a stop to prevent the ice reaming blade 51 from further movement, and second, to provide back support for the ice reaming blade 51 as it cuts into the ice. Two or three rotations of the auger 20 with the ice reaming blade 51 in use position may be sufficient to ream or flare the lower portion 41 of the ice hole 37 as illustrated in FIG. 10.

The receptacle 56 and the retaining loop 57 may be affixed to the central shaft 21 near the split portion of the split ring 27 which may situate them quite near to the short stabilizing post 61. This placement may insure that the ice reaming blade 51 is situated properly for the short stabilizing post 61 to function as the stop, as described above. The latch assembly 55 may be substantially 90° clockwise from a direct line along the rod 54 to permit the necessary arc of rotation of the ice reaming blade 51 and to insure that the ice reaming blade 51 lies wholly within the split ring 27 when in the rest position. No stop may be needed when the ice reaming blade 51 is in the rest position since there are no forces on the blade and the latch assembly 55 in which the handle 53 is held may maintain the blade securely.

The latch assembly 55 may utilize any adequate latch known in the art. However, a latch with a spring biased bar 67 may function well so that the user need only touch the bar to open the latch and free the handle 53 while continuing to operate the auger with the motor running. When the ice hole 37 has been reamed, the user may move the handle 53 back in one quick motion so the latch may engage and hold the handle 53 securely and the ice reaming blade 51 may be returned to the rest position. The entire reaming operation may be effectuated without the need to turn off the motor or remove the auger from the ice hole.

Figure 5:
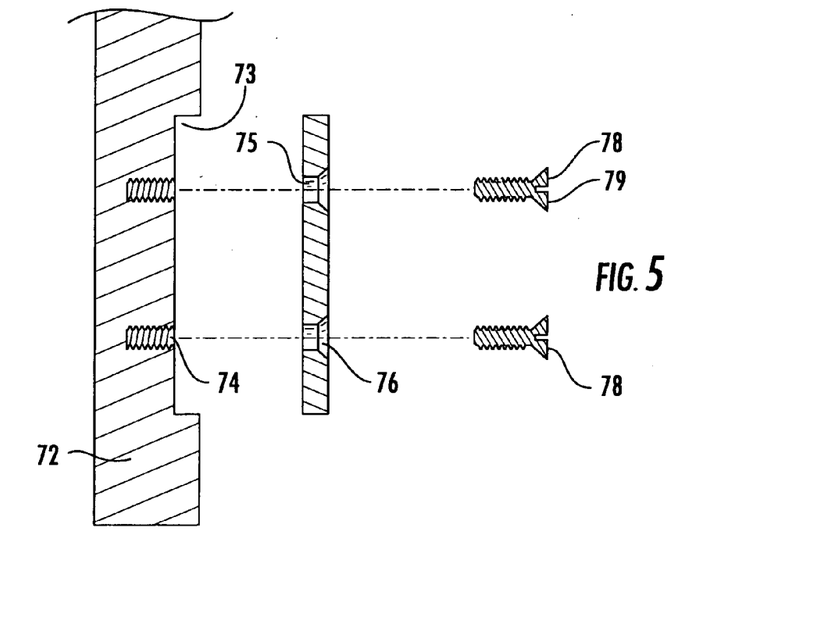
FIG. 5 is a side sectional exploded view of the lower portion of the rod, the reaming blade and the attaching screws of an alternate embodiment.
Figure 6:
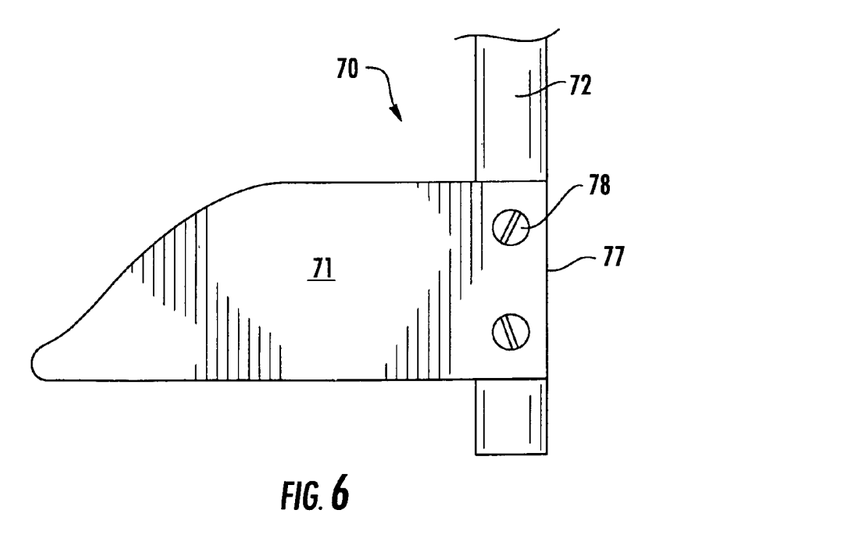
FIG. 6 is a front plan view of the reaming blade and rod of the alternate embodiment.

An alternative ice reaming assembly 70 may provide a removable ice reaming blade 71 as seen in FIGS. 5 and 6. This blade may be removed for sharpening or repair, or changed if it should break. When a removable ice reaming blade 71 is used, the rod 72 may have a recess 73 along the outer surface where the removable ice reaming blade 71 may be attached to the rod 72. The length of the recess 73 may be just sufficient for the back surface of the removable ice reaming blade 71 to be seated therein. The depth of the recess 73 may not be the full thickness of the removable ice reaming blade 71, but may be sufficiently deep to seat the blade and not permit any movement of the blade in any direction once the blade is properly secured. There may be two threaded holes 74 in the rod 72, one above the other, and spaced to provide substantial support and adequate security once the removable ice reaming blade 71 is fastened to the rod 72. The removable ice reaming blade 71 may have two holes 75 near the back edge 77 spaced for cooperation with the holes 74 in the rod 72. Two screws 78 with flat heads 79 may be used to securely affix the removable ice reaming blade 71 to the rod 72. Surrounding the two holes 75 may be depressions or countersinks 76 in the front surface of the ice reaming blade 71 dimensioned so that once the screws 78 are fully seated the flat heads 79 may be flush with the front surface of the blade. The screws 78 may be Phillips type screws, Allen type screws, they may have slotted heads, or utilize any other activation means known in the art.

Figure 2:
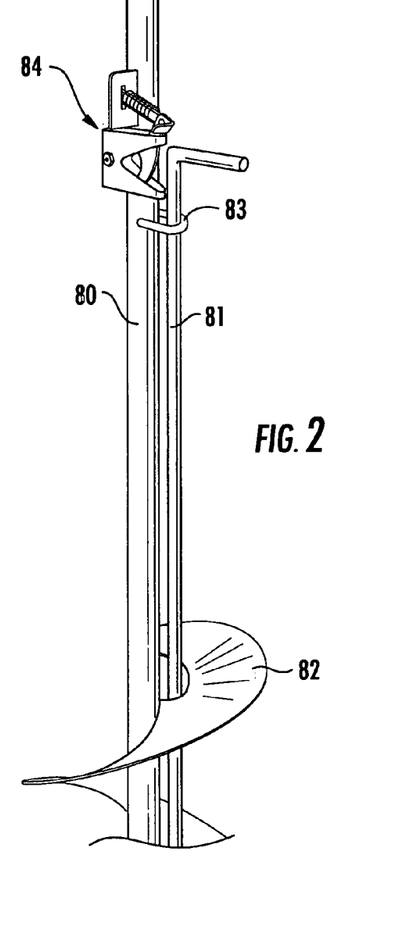
FIG. 2 is a perspective view of the upper portion of an ice auger having an extra long central shaft and equipped with the ice reaming blade assembly.

In very northern areas where the ice may easily be three or more feet thick, ice augers may have an extended central shaft 80, as seen in FIG. 2, to enable the user to maintain a suitable hold on the auger as it penetrates down into the substantial ice layer. The helical blade 82 may be of the usual dimensions and may be affixed along the lower portion of the extended central shaft 80. In such situations, the length of the rod 81 may also be extended. When this extended auger is fitted with an ice reaming blade, a second retaining loop 83 or clamp may be affixed to the upper portion of the central shaft 80 just below the level of the latch assembly 84 so that the extended rod 81 cannot wobble or become damaged or misaligned.

An ice auger 20 dimensioned to cut an 8 inch ice hole 37 may be fitted with a vertically oriented ice reaming blade 51 that may typically be 3/16 inch (0.5 cm) thick with a horizontal upper edge 58 of 2.5 inches (6.4 cm), a horizontal lower edge 63 of 4.0 inches (10.2 cm), a vertical rear edge 64 of 1.5 inches (3.8 cm), and a slanted cutting edge 65 of 2.0 inches (5.1 cm). The cutting edge 65 may be at an angle of 40°-45° and the cutting surface 66 may be at an angle of substantially 10°. However, the cutting edge 65 may not be straight, but may have a slight concavity 60 about 1/3 of the distance from the lower edge 63. This concavity 60 may provide a slight rounding of the flared walls resulting in a somewhat softer shape. An ice reaming blade suitable for use with an ice auger used to prepare an ice hole that is larger or smaller than 8 inches (20.3 cm) may be dimensioned accordingly.

Figures 7, 8:
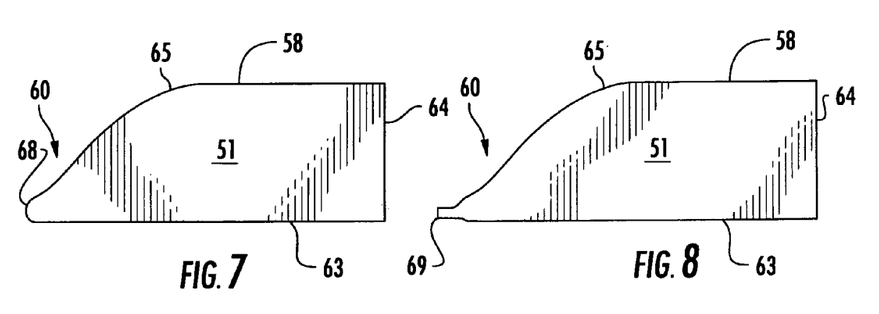
FIG. 7 is a front plan view of the reaming blade of the first embodiment.
FIG. 8 is a front plan view of the reaming blade of the first embodiment with the end tab.

The apex 68 of the ice reaming blade 51, the point where the slanted cutting edge meets the horizontal lower edge, may be substantially pointed, but for optimum use, the sharp point itself may be cut off, blunted or rounded as seen in FIG. 7. If the ice reaming blade 51 is left with a sharp point at the apex 68 and the user lifts up on the auger 20 with the ice reaming blade 51 in use position after the ice hole has been reamed and the motor is still running, the ice reaming blade 51 may cut into the ice layer and the hole may be reamed all the way up thereby resulting in a hole with completely vertical walls and of slightly greater diameter then the original hole made by the ice cutting blade 25. Removing the point at the apex 68 of the blade may prevent the blade from continuing to cut through the wall of the ice hole even if the auger is unintentionally lifted after the bottom of the hole has been reamed and the motor is still running. As a further guarantee that the hole cannot be reamed up its entire height, a stop tab 69 may be formed at the apex 68 of the reaming blade 51. This may be seen in FIG. 8.

The instant invention not only permits the user to carry only one ice cutting tool, but the modified auger 20 of the instant invention may also permit the user to cut the ice hole and ream the ice hole in one operation without having to shut the motor off or pull the auger out of the ice hole.

While several embodiments of the present invention have been illustrated and described in detail, it is to be understood that this invention is not limited thereto and may be otherwise practiced within the scope of the following claims.

I claim:

1. An ice hole reaming assembly in combination with an ice auger having a central shaft with an upper end and a lower end, a helical blade affixed along an inside edge to the central shaft and extending outwardly therefrom, a concave split ring affixed about the lower end of the central shaft, an ice cutting blade reversibly attached to a leading edge of the split ring, and a vertically oriented ice penetrating blade affixed to the lower end of the central shaft, said ice hole reaming assembly comprising:
    a series of cutouts along the inside edge of the helical blade, said cutouts in vertical alignment forming a channel adjacent to the central shaft;
    a cylindrical receptacle having an upper rim and a floor securely affixed to the central shaft beneath the channel near the lower end of the central shaft;
    a rod disposed within said channel and extending substantially the length of the central shaft, said rod having a first end and a second end, said second end being disposed in the receptacle such that the rod is supported therein, said rod being parallel to and in spaced relation with the central shaft, a portion of the first end of the rod extending above the channel being bent into a right angle said bent portion forming a handle;
    an ice reaming blade having a top edge, a bottom edge, front and back surfaces, a rear edge and a forward angled cutting edge, said ice reaming blade being securely attached to the rod above the upper rim of the receptacle, said attachment to the rod being along the back surface adjacent to the rear edge, said ice reaming blade extending outwardly from the rod so as to be positioned directly beneath and in the same plane as the handle, and said ice reaming blade having a rest position wherein it does not extend beyond the split ring and a use position wherein the ice reaming blade extends outwardly beyond the split ring to ream the ice hole;
    a retaining loop affixed to the central shaft above the top edge of the ice reaming blade and encircling said rod, the rod being freely rotatable within the retaining loop, said retaining loop to maintain the rod in vertical orientation adjacent to the central shaft and to prevent the rod from being lifted out of the receptacle; and
    a latch assembly affixed to the central shaft substantially at the level of the handle and positioned such that when the handle is engaged in the latch assembly the ice reaming blade is in the rest position and when the handle is released from latch assembly the rod rotates and the ice reaming blade is moved to the use position;
    whereby the ice hole can be drilled and reamed in one operation while the auger is activated.

2. An ice hole reaming assembly as described in claim 1 wherein the ice reaming blade is attached to the rod by welding.

3. An ice hole reaming assembly as described in claim 1 wherein the ice reaming blade is attached to the rod by an attachment assembly comprising:
    a vertical recess in a side of the rod dimensioned to accept the back surface of the ice reaming blade adjacent to its rear edge, two threaded holes in the rod, one above the other, within said recess, two holes in the ice reaming blade situated to communicate with the two threaded holes in the rod, and two screws for passage through the holes in the ice reaming blade and for cooperation with the two threaded holes in the rod.

4. An ice hole reaming assembly as described in claim 3 wherein the two screws have flat heads.

5. An ice hole reaming assembly as described in claim 4 further comprising countersinks in the front surface of the ice reaming blade surrounding the two holes such that when the screws are fully seated through the holes in the ice reaming blade and into the threaded holes in the rod the flat heads of the screws are flush with the front surface of the ice reaming blade.

6. An ice hole reaming assembly as described in claim 1 wherein the forward angled cutting edge of the ice reaming blade has a concavity at a point substantially one third of the distance from the bottom edge.

7. An ice hole reaming assembly as described in claim 1 wherein the forward angled cutting edge of the ice reaming blade forms an apex with the bottom edge and said apex is rounded.

8. An ice hole reaming assembly as described in claim 1 wherein the forward angled cutting edge of the ice reaming blade forms an apex with the bottom edge and a stop tab is formed at said apex.

9. An ice hole reaming assembly as described in claim 1 wherein the forward angled cutting edge of the ice reaming blade forms an angle of between 40° and 45° with the bottom edge.

10. An ice hole reaming assembly as described in claim 1 further comprising at least two vertical stabilizing posts equidistantly arranged about the central shaft, a first post affixed between the split ring and the helical blade along outside edges thereof and disposed radially outward from the retaining loop such that when the ice reaming blade is in the use position the first post functions as a stop to prevent further rotation of said ice reaming blade and to support said ice reaming blade, and at least one second stabilizing post affixed between two portions of the helical blade along outside edges thereof, whereby the stabilizing posts provide stability to the ice auger and prevent wobble during operation.

11. An ice hole reaming assembly as described in claim 1 further comprising an opening in the floor of the receptacle for drainage and to prevent the rod from freezing in place.

12. An ice hole reaming assembly as described in claim 1 wherein the latch assembly includes a spring biased activation bar to enable a user to release the handle in a single motion and re-engage the handle also in a single motion while the auger is activated.

13. An ice hole reaming assembly as described in claim 1 wherein the ice reaming blade traverses through an angle of substantially 180° between the rest position and the use position.

14. An ice hole reaming assembly as described in claim 1 further comprising a rod retaining means in vertical alignment with said retaining loop and disposed near the upper end of the central shaft below the latch assembly for maintaining proper alignment and providing support to the first end of said rod, said rod being freely rotatable therewithin.

15. An ice auger including an ice hole reaming blade for use in cutting a hole in the ice and reaming the bottom edge of the ice hole, said ice auger comprising:
    a central shaft having an upper end and a lower end;
    a helical blade having an inside edge and an outside edge and being affixed to the central shaft along the inside edge, and a series of cutouts along the inside edge, said cutouts being in vertical alignment forming a channel adjacent to the central shaft;
    a concave split ring affixed about the lower end of the central shaft and having a leading edge and a following edge;
    an ice cutting blade reversibly attached to the leading edge of the split ring;
    a vertically oriented ice penetrating blade affixed to the lower end of the central shaft and extending therebeyond;
    a cylindrical receptacle having an upper rim and a floor securely affixed to the central shaft beneath the channel and near the lower end of the central shaft;
    a rod disposed within said channel and extending substantially the length of the central shaft and having a first end and a second end, said second end being disposed in the receptacle such that the rod is supported therein, said rod being parallel to and in spaced relation with the central shaft, a portion of the first end of the rod extending above said channel being bent into a right angle said bent portion forming a handle;
    an ice reaming blade having a top edge, a bottom edge, front and back surfaces, a rear edge and a forward angled cutting edge, said ice reaming blade being securely attached to the rod above the upper rim of the receptacle, said attachment to the rod being along the back surface adjacent to the rear edge, said ice reaming blade extending outwardly from the rod so as to be positioned directly beneath and in the same plane as the handle, and said ice reaming blade having a rest position wherein it does not extend beyond the split ring and a use position wherein the ice reaming blade extends outwardly beyond the split ring to ream the ice hole;
    a retaining loop affixed to the central shaft above the upper edge of the ice reaming blade and encircling said rod, the rod being freely rotatable within the retaining loop, said retaining loop to maintain the rod in vertical orientation adjacent to the central shaft and to prevent the rod from being lifted out of the receptacle; and
    a latch assembly affixed to the central shaft substantially at the level of the handle and positioned such that when the handle is engaged in the latch assembly the ice reaming blade is in the rest position and when the handle is released from latch assembly the rod rotates and the ice reaming blade is moved to the use position;
    whereby the ice hole can be drilled and reamed in one operation while the auger is activated.

16. An ice auger as described in claim 15 further comprising at least two vertical stabilizing posts equidistantly arranged about the central shaft, a first post affixed between the split ring and the helical blade along outside edges thereof and disposed radially outward from the retaining loop such that when the ice reaming blade is in the use position the first post functions as a stop to prevent further rotation of said ice reaming blade and to support said ice reaming blade, and at least one second stabilizing post affixed between two portions of the helical blade along outside edges thereof, whereby the stabilizing posts provide stability to the ice auger and prevent wobble during operation.

17. An ice auger as described in claim 15 further comprising a opening in the floor of the receptacle for drainage and to prevent the rod from freezing in place.

18. An ice auger as described in claim 15 wherein the latch assembly includes a spring biased activation bar to enable a user to release the handle in a single motion and re-engage the handle also in a single motion while the auger is activated.

19. An ice auger as described in claim 15 wherein the ice reaming blade traverses through an angle of substantially 180° between the rest position and the use position.

20. An ice auger as described in claim 15 further comprising a rod retaining means in vertical alignment with said retaining loop and disposed near the upper end of the central shaft below the latch assembly for maintaining proper alignment and providing support to the first end of said rod, said rod being freely rotatable therewithin.

21. An ice hole reaming assembly in combination with an ice auger having a central shaft with an upper end and a lower end, a helical blade affixed along an inside edge to the central shaft and extending outwardly therefrom, and an ice cutting blade, said ice hole reaming assembly comprising:
    a series of cutouts along the inside edge of the helical blade, said cutouts in vertical alignment forming a channel adjacent to the central shaft;
    a rod disposed within said channel and extending substantially the length of the central shaft, said rod having a first end and a second end and being parallel to and in spaced relation with the central shaft, a portion of the first end of the rod extending above the channel being bent into a right angle said bent portion forming a handle;
    support means situated beneath the rod to support said rod and into which the second end of the rod is rotatably disposed;
    an ice reaming blade securely attached to the second end of the rod above the support means, said ice reaming blade extending outwardly from the rod, and said ice reaming blade having a rest position and a use position in which to ream the ice hole;
    retaining means to maintain the rod in vertical orientation adjacent to the central shaft and to prevent the rod from being lifted out of the support means; and
    a latch assembly affixed to the central shaft substantially at the level of the handle and positioned such that when the handle is engaged in the latch assembly the ice reaming blade is in the rest position and when the handle is released from latch assembly the ice reaming blade is moved to the use position to ream the ice hole.

* * * * *